United States Patent [19] | [11] 4,112,178
Brown | [45] Sep. 5, 1978

[54] AQUEOUS POLYURETHANE UNDERCOATS

[75] Inventor: Albert E. Brown, Glen Cove, N.Y.

[73] Assignee: Columbia Ribbon & Carbon Manufacturing Co., Inc., Glen Cove, N.Y.

[21] Appl. No.: 815,633

[22] Filed: Jul. 14, 1977

[51] Int. Cl.[2] .................. B32B 3/26
[52] U.S. Cl. .................. 428/306; 427/152; 427/153; 428/320; 428/914
[58] Field of Search .................. 428/304, 320, 914, 306, 428/305; 282/27.5; 427/146, 152, 153

[56] References Cited

U.S. PATENT DOCUMENTS

| | | | |
|---|---|---|---|
| 3,573,957 | 4/1971 | Findlay et al. | 428/311 |
| 3,628,979 | 12/1971 | Newman | 428/320 |
| 3,904,802 | 9/1975 | Brown et al. | 428/320 |
| 3,904,803 | 9/1975 | Brown et al. | 428/320 |
| 3,936,559 | 2/1976 | Newman | 428/320 |

*Primary Examiner*—William J. Van Balen
*Attorney, Agent, or Firm*—Thomas L. Tully

[57] ABSTRACT

Pressure-sensitive transfer elements comprising water-applied resinous base coating supporting a resinous ink-releasing layer, characterized by the undercoating consisting essentially of a water-dispersible, water-insoluble hydrophilic polyurethane resin.

10 Claims, 2 Drawing Figures

AQUEOUS POLYURETHANE UNDERCOATS

Figure 1:
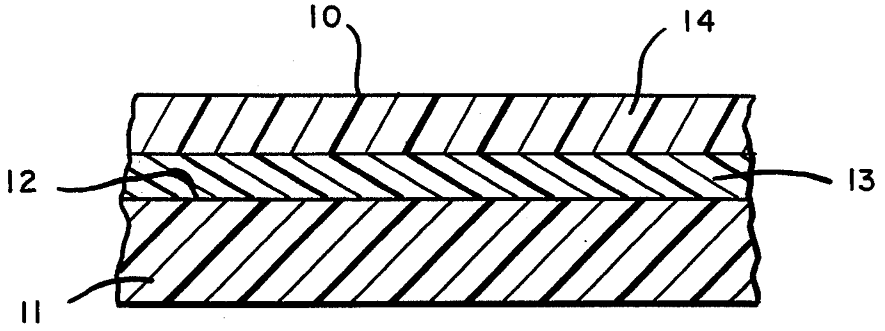

The present invention is particularly concerned with the production of pressure-sensitive transfer elements, such as carbons and ribbons, by solvent-coating techniques wherein the solvent used is water rather than the conventional volatile organic solvents which are more expensive, more dangerous and objectionable from an air-pollution standpoint.

Water-applied ink coating compositions are known in the art and reference is made to U.S. Pat. Nos. 3,314,814 and 3,904,803 which are assigned to Columbia Ribbon and Carbon Mfg. Co., Inc. These patents, particularly the latter patent, discuss the problems involved in applying a uniform coating of an aqueous ink composition to a plastic film foundation or to a resinous undercoating present on such a film foundation, and the problems involved in obtaining a sufficient, consistently-uniform bond between the film foundation, the undercoating and the ink layer whereby separation of these layers will not occur under the effects of typing pressure during repeated reuse of the transfer elements.

Until the present invention all prior proposals have involved the use of undercoating resins which are either soluble or swellable in the aqueous vehicle used to apply the ink layer, or which dry to form sticky, adhesive undercoatings having a physical affinity for the ink layer. Soluble or swellable undercoatings are objectionable because they become softened by the aqueous vehicle used to apply the ink layer and they absorb the aqueous vehicle, making complete drying of the ink layer more difficult. Also the imaging qualities of the transfer elements are inconsistent, depending upon the amount of time during which the aqueous vehicle was in contact with the undercoating prior to drying, i.e., the coating speed and drying conditions, and the completeness of the removal of the aqueous vehicle during drying. While prior-known insoluble and non-swellable sticky undercoatings do not present these problems, they are objectionable from the standpoint of handling, transporting and/or winding prior to application of the ink layer.

It is the principal object of the present invention to provide novel transfer elements such as carbons and ribbons, optionally having a film foundation such as polypropylene, a resinous base coating and a resinous ink layer, the undercoating and preferably also the ink layer being applied by means of water vehicle and the dried base coating being non-sticky and being substantially inert, i.e., insoluble and non-swellable, with respect to the vehicle used to apply the ink layer.

It is another object of the present invention to provide solvent-coated transfer elements which can be produced in the absence of volatile organic solvents and which are consistently uniform with respect to their imaging qualities.

It is yet another object of this invention to provide novel self-supporting transfer elements which do not require a backing sheet such as paper or preformed plastic film and which have a back-coating which is strong, impervious and resistant to cutting and tearing under the effects of repeated typing pressures.

Figure 2:
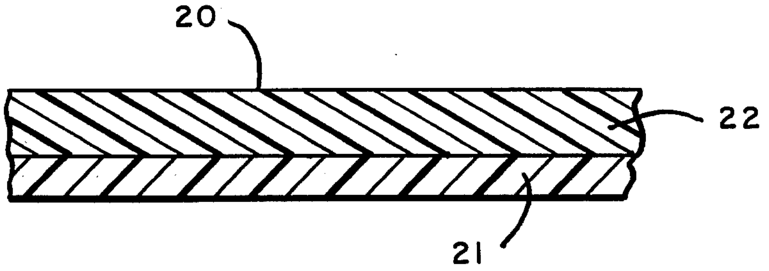

These and other objects and advantages of the present invention will be apparent to those skilled in the art in the light of the present disclosure including the drawing, in which:

FIG. 1 is a diagrammatic cross-section, to an enlarged scale, of a pressure-sensitive transfer element 10 according to one embodiment of the present invention, said element having a preformed plastic film foundation 11 having bonded to surface 12 thereof an aqueous-applied polyrurethane resin bonding layer 13 and a microporous resinous ink layer 14; and FIG. 2 is a diagrammatic cross-section, to an enlarged scale, of a self-supporting pressure-sensitive transfer element 20 according to another embodiment of the present invention comprising an aqueous-applied polyurethane resin base coating 21 having bonded thereto a microporous resinous ink layer 22.

The essential novelty of the present invention resides in the discovery that aqueous polyurethane resin compositions have exceptional versatility and a wide variety of useful properties which give rise to new and unexpected results when such compositions are used as base coating compositions for the production of pressure-sensitive transfer elements.

The aqueous polyurethane resin undercoating or base coating compositions used according to the present invention are colloidal dispersions rather than solutions, the extremely fine resin particles being insoluble in water but being uniformly suspended in the aqueous vehicle to provide ease and uniformity of application to a flexible foundation or to a casting surface.

The applied undercoatings 13 or base coatings 21 dry completely and quickly at a temperature of about 200° F to form smooth, non-tacky coatings which have an affinity for both water and organic solvents such as aliphatic alcohols, esters and ketones, thereby providing excellent receptivity for ink compositions applied thereto by means of water or such organic solvents. The ease of drying such coatings quickly and completely leads to the production of consistently uniform transfer elements as opposed to prior-known organic solvent-applied polyurethane resin undercoatings and other resinous undercoatings which are difficult to dry and/or cure completely and which provide non-uniform results with respect to bonding strength and/or pressure-sensitivity depending upon the presence of variable amounts of residual solvent therein and/or varying degrees of cure.

The present aqueous polyurethane resin compositions provide tough, cut-resistant coatings which are exceptionally inert to the penetration of the oily ink vehicles of the ink layer applied thereto. This inertness prevents the oily ink vehicles from penetrating through to the underlying film foundation 11 if one is present as shown in FIG. 1, thereby avoiding softening and puckering of the film foundation and weakening of the bond between the film and the undercoating. This is particularly important in view of the fact that the present transfer elements are reusable due to the microporous structure of the ink layer 14 which permits a portion of the ink present therein to be metered to the copy sheet under each typing pressure.

The toughness and cut-resistance of the present aqueous-applied polyurethane undercoatings is important at least in two different respects. Firstly, the oil-barrier properties of any undercoating are dependent upon the integrety of the coating. If the coating 13 is ruptured by the type face during use, the oily ink is able to penetrate to the backing film 11 through such ruptures, thereby softening or plasticizing the film foundation 11 and/or migrating between the surface 12 of the film foundation 11 and the undercoating 13 to weaken the bond therebetween. These properties of toughness and cut-resistance are also important in connection with the embodiment of the present invention shown in FIG. 2 in which self-supporting transfer elements 20 are produced by applying the aqueous polyurethane resin base coating 21 to a casting surface, applying the ink coating 22 thereover, and then removing the dried, bonded layers from the casting surface as a self-supporting transfer element 20 devoid of any pre-formed plastic film foundation. According to such embodiment the polyurethane resin back coating 21 provides strength to the microporous ink layer 22 under the effects of winding, feeding through a typewriter, and typing pressure.

The aqueous polyurethane undercoating compositions of the present invention are suitable for use in the form of either curable or non-curable compositions. Thus, a suitable polyfunctional cross-linking agent may be included in the aqueous polyurethane resin composition to render the composition curable during drying whereby the dried coating has increased resistance to volatile organic solvents such as aliphatic alcohols, esters and ketones which can soften the non-curable aqueous-applied polyurethane resin coatings. Surprisingly, ink layers applied by means of volatile organic solvents such as aliphatic alcohols, esters and/or ketones bond equally well to the present polyurethane undercoatings regardless of whether they are cured or not whereas ink layers applied by means of aqueous vehicles bond better to the uncured polyurethane resin undercoats than to the undercoats which contain a cross-linking agent and are cured during drying.

Another advantage of the present aqueous polyurethane base coatings aside from toughness and cut-resistance, is their release properties with respect to coating surfaces including conventional plastic films such as polyethylene terephthalate (Mylar), polyethylene and polypropylene. Such release properties permit the aqueous polyurethane resin base coating to be applied to such surfaces, dried and/or cured, supercoated with the ink composition, dried to form the microporous ink layer and thereafter stripped clearly from the casting surface as a self-supporting transfer element consisting of the tough polyurethane backing layer bonded to the microporous ink layer.

In cases where a supporting pre-formed plastic film such as Mylar, polyethylene or polypropylene is to be retained as support component for the present transfer elements, such is accomplished in conventional manner through the use of films which are pre-treated to increase their bonding strength with respect to coatings applied thereto. The most common pretreatment employed by manufacturers of plastic films involves subjecting such films to a corona discharge, ozone, flame treatment or other oxidation means to cause a partial oxidation of the surface of the film to be coated. Other means involve the application of receptive coatings such as the Tyzor compositions disclosed in U.S. Pat. No. 3,620,802 including tetraisopropyl titanate, surface roughening as by sandblasting, etc.

The preferred aqueous polyurethane resin compositions of the invention are commercially-available under the registered trademark Neorez R960. Such compositions are colloidal dispersions of aliphatic polyurethanes. Suitable polyurethanes are the polyether polyurethanes, the polyester polyurethanes and the polyamide polyurethanes in the form of aqueous dispersions. Where curable polyurethane resin compositions are desired, small amounts of conventional polyfunctional cross-linking agents are included such as aromatic or aliphatic diisocyanates or other polyfunctional chemicals capable of reacting with the polyurethane resin chains to cause crosslinking therebetween.

The following examples are set forth as illustrative and should not be considered as limitative.

EXAMPLE 1

A sheet of 0.5 mil polyethylene terephthalate (Mylar) which has been surface treated by exposure to corona discharge is coated on the treated surface with a thin continuous layer of an aqueous colloidal dispersion of an aliphatic urethane resin which is commercially-available under the registered trademark Neorez R-960. This material is believed to be a polyether polyurethane formed by reacting a water-dispersible polyethylene glycol polyether with an alkylene diisocyanate. The urethane layer is solidified by exposure to forced hot air at a temperature of 200° F for a period of about 10 minutes and forms a strong, cut-resistant, clear coating on the Mylar film having excellent resistance to organic solvents such as toluene and to water.

Thereafter the polyurethane layer may be coated with water-applied microporous ink compositions based upon polyvinyl alcohol binder materials, as disclosed in U.S. Pat. Nos. 3,904,803 and 3,414,814, or with organic solvent-applied microporous ink compositions based upon vinyl or other resinous binder materials, as disclosed in U.S. Pat. Nos. 3,689,301 and 3,037,879, to produce pressure-sensitive transfer sheets and ribbons having excellent durability under repeated reuse. The ink layer remains bonded to the polyurethane undercoating and resists picking and chipping under the effects of repeated type blows over the same area. Similarly the polyurethane undercoating remains bonded strongly to the treated base film.

If desired the chemical resistance of the undercoating may be increased with respect to certain volatile organic solvents which may be present in the ink coating composition, such as isopropyl alcohol, which are able to soften the uncured polyurethane, by the inclusion of a small amount of a curing agent such as one available from Polyvinyl Chemical Industries under the registered trademark Crosslinker CX-100. This material is believed to be a polyfunctional isocyonate.

EXAMPLE 2

A self-supporting transfer element having excellent dimensional strength and resistance to cutting and breaking under the effects of typing pressure may be produced by applying the aqueous polyurethane dispersion of Example 1 to a smooth casting surface, applying the ink layer thereover and then stripping the composite from the casting surface as a self-supporting transfer element. The polyurethane backing layer is sufficiently strong, even in the absence of a backing film, to resist cutting and breaking under the force of the type bars and the absence of the backing film renders the unsupported transfer element thinner than otherwise possible whereby the images formed therewith correspond more sharply to the dimensions of the type face than in cases where the cushioning effect of an interposed pre-formed plastic film is present.

Variations and modifications may be made within the scope of the claims and portions of the improvements may be used without others.

I claim:

1. Pressure-sensitive transfer element comprising a smooth, non-tacky base layer of water-applied polyurethane resin having bonded to the smooth surface thereof, a volatile-solvent-applied pressure-sensitive ink-releasing microporous resinous layer containing within the pores thereof pressure-exudable ink comprising oleaginous material and coloring matter, said base layer being impermeable and insoluble with respect to the volatile vehicle used to apply the ink layer and being inert to the penetration of the oily ink vehicle of the ink layer present thereon.

2. Transfer element according to claim 1 in which said base layer comprises the support therefor.

3. Transfer element according to claim 1 in which said base layer is bonded to a preformed plastic film which forms the support for said transfer element.

4. Transfer element according to claim 3 in which said plastic film is a surface-treated polyolefin film.

5. Transfer element according to claim 1 in which said water-applied polyurethane resin comprises a cross-linking agent and is cured.

6. Method for producing pressure-sensitive transfer elements comprising the steps of applying a thin layer of an aqueous polyurethane resin composition to a surface, evaporating water from said composition to form a thin smooth dry layer of said polyurethane resin, applying over said smooth dry layer a thin coating of resinous composition comprising a resinous binder material, an oleaginous pressure-flowable material which is incompatible with said binder material, coloring matter, and a volatile liquid vehicle, said smooth dry layer being impermeable and insoluble with respect to said volatile liquid vehicle and being inert to the penetration of said oleaginous pressure-flowable material, and evaporating said volatile vehicle to form a microporous layer of said resinous binder material bonded to said smooth polyurethane resin layer and containing within the pores thereof said oleaginous material and coloring matter as a pressure-exudable ink.

7. Method according to claim 6 in which said surface to which said polyurethane resin composition is applied is a casting surface, and said dry polyurethane resin layer and said bonded microporous resin layer are removed therefrom as a self-supporting transfer element.

8. Method according to claim 6 in which said surface to which said polyurethane resin composition is applied is a thin preformed film of surface-treated polyolefin, which film bonds to said polyurethane layer as a support for said transfer element.

9. Method according to claim 6 in which said polyurethane resin composition contains a cross-linking agent and said polyurethane layer is cured prior to application of said microporous layer.

10. Method according to claim 6 in which said volatile liquid vehicle of said resinous composition comprises water.

* * * * *